United States Patent
Doi et al.

[11] 4,158,482
[45] Jun. 19, 1979

[54] INVERTED TELEPHOTO TYPE SUPER-WIDE ANGLE LENS

[75] Inventors: Yoshikazu Doi; Yutaka Sakai, both of Omiya, Japan

[73] Assignee: Fuji Photo Optical Co., Ltd., Omiya, Japan

[21] Appl. No.: 826,756

[22] Filed: Aug. 22, 1977

[30] Foreign Application Priority Data

Aug. 27, 1976 [JP] Japan ................. 51-102433

[51] Int. Cl.² .............................. G02B 9/64
[52] U.S. Cl. ................................. 350/214
[58] Field of Search ........................... 350/214

[56] References Cited
U.S. PATENT DOCUMENTS

3,736,049  5/1973  Shimizu ..................... 350/214
3,958,864  5/1976  Glatzel ................. 350/214 X Primary Examiner—Paul A. Sacher

[57] ABSTRACT

An inverted telephoto lens having a super-wide angle of view is composed of a negative meniscus lens L1 convex to the front as numbered consecutively from front to rear, a biconvex lens L2, a negative meniscus lens L3 convex to the front, a cemented positive doublet of a negative lens L4 and a positive lens L5, a biconvex lens L6, a biconcave lens L7 the rear surface of which has radius of curvature greater than that of the front surface thereof, a positive meniscus lens L8 convex to the rear, and a positive lens L9 arranged in this order. The Abbe dispersion number of the biconvex lens L6 is more than 53 and less than 61. The difference between the Abbe number of the negative lens L4 and that of the positive lens L5 of the doublet is more than 10 and less than 16.

4 Claims, 13 Drawing Figures

ASTIGMATISM
— SAGITTAL
--- MERIDIONAL $\omega = 32°$ $\omega = 42°$

COMA
— d-LINE
--- g-LINE

SPHERICAL ABERRATION
SINE CONDITION

ASTIGMATISM

DISTORTION

— SAGITTAL
--- MERIDIONAL

SPHERICAL ABERRATION
SINE CONDITION

ASTIGMATISM

— SAGITTAL
--- MERIDIONAL

DISTORTION

SPHERICAL ABERRATION
SINE CONDITION

ASTIGMATISM

— SAGITTAL
--- MERIDIONAL

DISTORTION

INVERTED TELEPHOTO TYPE SUPER-WIDE ANGLE LENS

BACKGROUND OF THE INVENTION

1. Field of the Invention

This invention relates to an inverted telephoto type super-wide angle lens, and more particularly to an inverted telephoto type super-wide angle lens which has a small size and a long back focal distance and well corrected aberrations.

2. Description of the Prior Art

Generally, in order to make the size of an inverted telephoto type super-wide angle lens small, the negative lens component in the front portion of the lens system is provided with a high refractive power and the lens component in the rear portion is designed to correct the aberrations of the whole lens system.

The above-described super-wide angle lens has a defect in that the rear face of the positive lens in the vicinity of the stop has a small radius of curvature convex to the image side and the convex rear face functions to greatly refract the lower half of the luminous flux incident to the lens system obliquely from a lower level. Particularly in case of a luminous flux containing light of short wavelength, a great difference appears between the refraction of the light of a short wavelength and that of the light of a standard wavelength, and accordingly, the correction for the coma and astigmatism is insufficient for the light of short wavelength. The insufficient correction of these aberrations appears on the final focal plane and accordingly the quality of the marginal portion of the image obtained is degraded.

SUMMARY OF THE INVENTION

The primary object of the present invention is to provide an inverted telephoto type super-wide angle lens which has a high performance with corrected aberrations.

Another object of the present invention is to provide an inverted telephoto type super-wide angle lens of compact size.

The above objects of the present invention are accomplished by a lens system comprising a negative meniscus lens L1 convex to the front as numbered consecutively from front to rear, a biconvex lens L2, a negative meniscus lens L3 convex to the front, a cemented positive doublet of a negative lens L4 and a positive lens L5, a biconvex lens L6, a biconcave lens L7 the rear surface of which has radius of curvature greater than that of the front surface thereof, a positive meniscus lens L8 convex to the rear, and a positive lens L9, wherein the Abbe numbers of the lenses L4, L5 and L6, $\nu 4$, $\nu 5$ and $\nu 6$, respectively, satisfy the conditions of $53 < \nu 6 < 61$ and $10 < \nu 4 - \nu 5 < 16$.

DESCRIPTION OF THE PREFERRED EMBODIMENTS

The inverted telephoto super-wide angle lens in accordance with the present invention comprises a negative meniscus lens L1 convex to the front as numbered consecutively from front to rear, biconvex lens L2, a negative meniscus lens L3 convex to the front, a cemented positive doublet of a negative lens L4 and a positive lens L5, a biconvex lens L6, a biconcave lens L7 the rear surface of which has radius of curvature greater than that of the front surface thereof, a positive meniscus lens L8 convex to the front, and a positive lens L9, wherein the Abbe number $\nu 6$ of the lens L6 is designed to be as large as $53 < \nu 6 < 61$ to eliminate the drawback caused by the small radius of curvature $r_1$ of the negative meniscus lens L1, and the Abbe numbers $\nu 4$ and $\nu 5$ of the lenses L4 and L5 of the cemented doublet are designed to form an inverted achromatic lens component to make a balance in chromatic aberration with respect to the large Abbe number $\nu 6$ by satisfying the conditions of $10 < \nu 4 - \nu 5 < 16$.

Figure 1:
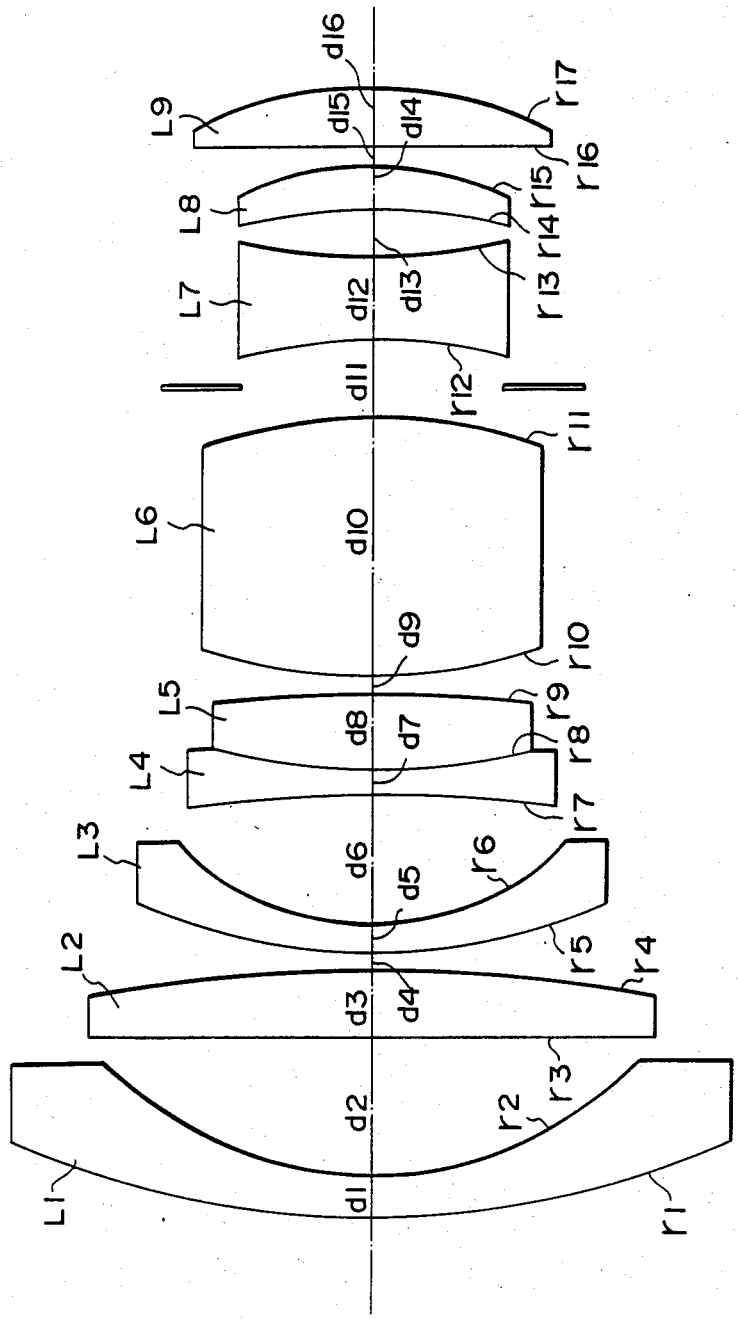
FIG. 1 is a diagram showing the construction of the lens in accordance with the present invention.
Figure 2A:
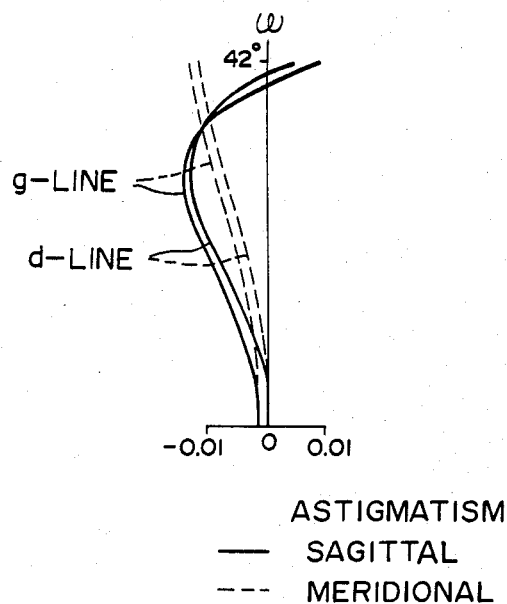
FIG. 2A depicts a graph representing the correction for astigmatism of the first embodiment of the invention.
Figure 2B:
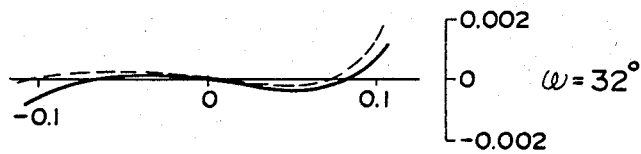
FIGS. 2B and 2C depict the graphs representing the correction for coma of the first embodiment.
Figure 2C:
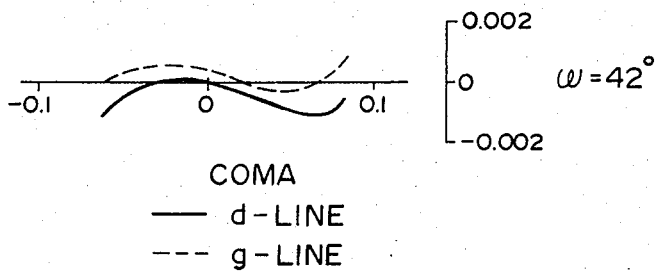
Figure 3A:
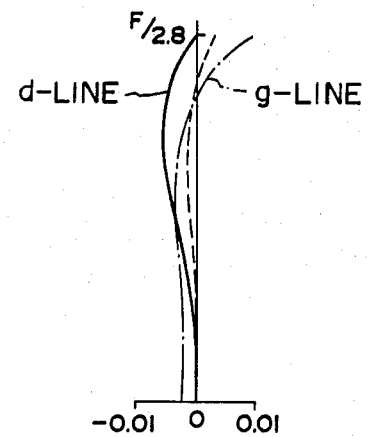
FIGS. 3A, 3B and 3C depict the graphs representing the correction for spherical aberration and the deviation in sine condition, astigmatism and distortion, respectively, of the first embodiment.
Figure 3B:
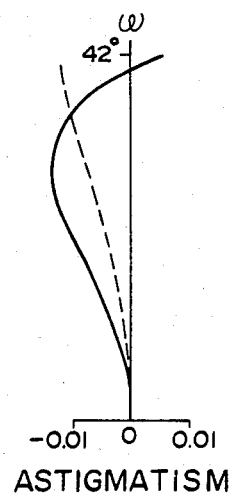
Figure 3C:
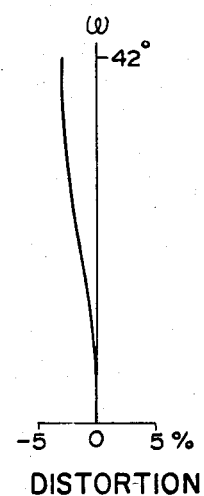

A preferred embodiment of the inverted telephoto type super-wide angle lens which has the composite focal length of 1.001, the back focal distance of 1.527, the angle of view of 84° and the aperture ratio of F/2.8 is constructed in conformity with Table I. The aberrations of the embodiment are shown in FIGS. 2A to 2C. In FIG. 2A, the solid line represents the astigmatism in the sagittar plane and the broken line in the meriodinal plane, and in FIGS. 2B and 2C, the solid line represents the coma for d-line and the broken line for g-line. FIGS. 3A to 3C also show the aberrations of the embodiment of Table I. In FIG. 3A, the solid line represents the spherical aberration for d-line, the chain line for g-line, and the broken line of the sine condition for d-line. From FIGS. 2A to 3C, it is clear that the difference between the aberrations for the light of short wavelength (g-line) and those for the light of long wavelength (d-line) is reduced.

Figure 4A:
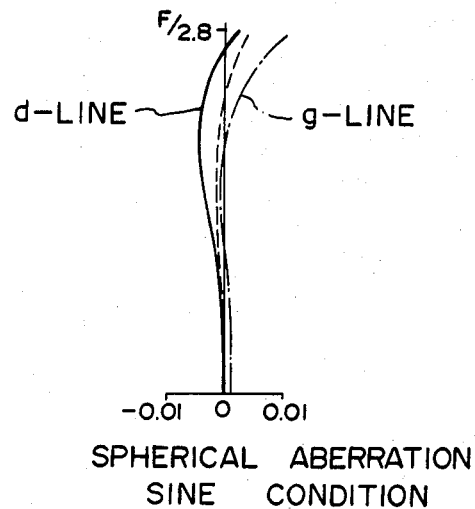
FIGS. 4A to 4C are graphs similar to FIGS. 3A to 3C representing the correction for aberrations of the second embodiment of the invention.
Figure 4B:
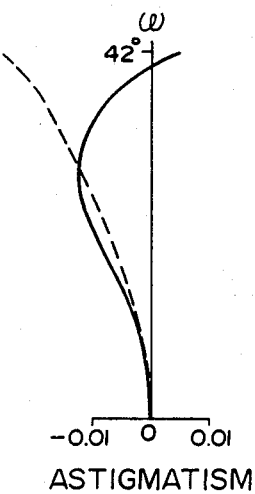
Figure 4C:
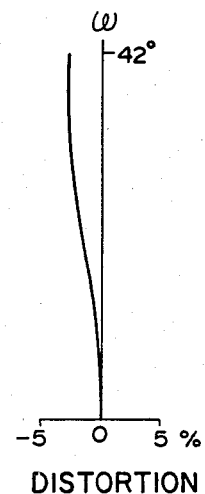

Table II shows a second embodiment of the lens system in accordance with the present invention which has the composite focal length of 1.008, the back focal distance of 1.541, the angle of view of 84° and the aperture ratio of F/2.8. The aberrations of the second embodiment are shown in FIGS. 4A to 4C.

Figure 5A:
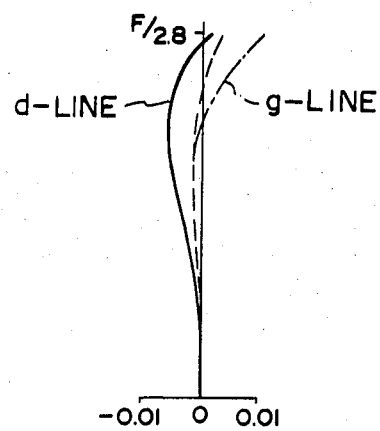
FIGS. 5A to 5C are graphs similar to FIGS. 3A to 3C representing the correction for aberrations of the third embodiment of the invention.
Figure 5B:
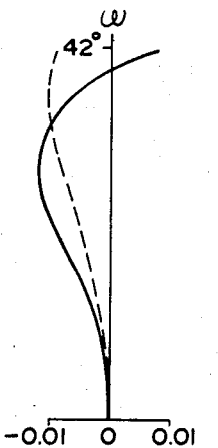
Figure 5C:
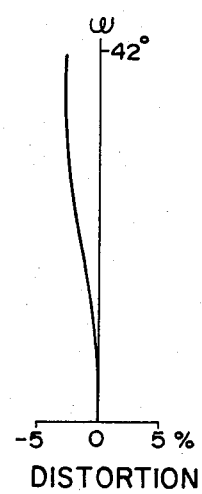

Table III shows a third embodiment of the lens system in accordance with the present invention which has the composite focal length of 1.000, the back focal distance of 1.528, the angle of view of 84° and the aperture ratio of F/2.8. The aberrations of the second embodiment are shown in FIGS. 5A to 5C.

In Tables I to III, the radii of curvature of the refracting surfaces, the axial air separations or thicknesses of lenses, the refractive indices for the sodium d-line and the Abbe dispersion numbers are respectively designated at r, d, N and $\nu$ which are numbered, respectively, by subscripts in order from front to rear.

In accordance with the present invention, it is possible to manufacture an inverted telephoto super-wide angle lens which can be used as a super-wide angle lens for a camera for 24×36 mm film, and has a focal length of 24 mm, the aperture ratio of F/2.8 and an effective diameter of the lens L1 of about 32 mm, and to which commercially available filter having a diameter of 49 mm is adaptable.

TABLE I

| | | | | |
|---|---|---|---|---|
| r1 | 1.64962 | | | |
| | | d1 0.06 | $N_1$ 1.6228 | $v_1$ 56.9 |
| r2 | 0.71623 | | | |
| | | d2 0.28 | | |
| r3 | 14.81481 | | | |
| | | d3 0.13 | $N_2$ 1.51823 | $v_2$ 59.0 |
| r4 | −3.41880 | | | |
| | | d4 0.01 | | |
| r5 | 1.20831 | | | |
| | | d5 0.04 | $N_3$ 1.62299 | $v_3$ 58.1 |
| r6 | 0.49574 | | | |
| | | d6 0.23 | | |
| r7 | ∞ | | | |
| | | d7 0.05 | $N_4$ 1.68273 | $v_4$ 44.5 |
| r8 | 0.97761 | | | |
| | | d8 0.15 | $N_5$ 1.69895 | $v_5$ 30.1 |
| r9 | −3.77074 | | | |
| | | d9 0.01 | | |
| r10 | 1.16782 | | | |
| | | d10 0.5 | $N_6$ 1.64000 | $v_6$ 60.2 |
| r11 | −0.88292 | | | |
| | | d11 0.134 | | |
| r12 | −0.82802 | | | |
| | | d12 0.15 | $N_7$ 1.76182 | $v_7$ 26.5 |
| r13 | 1.50082 | | | |
| | | d13 0.0625 | | |
| r14 | −1.67112 | | | |
| | | d14 0.0963 | $N_8$ 1.62041 | $v_8$ 60.3 |
| r15 | −0.73078 | | | |
| | | d15 0.01 | | |
| r16 | 100.00000 | | | |
| | | d16 0.1 | $N_9$ 1.62230 | $v_9$ 53.1 |
| r17 | −0.90074 | | | |

TABLE II

| | | | | |
|---|---|---|---|---|
| r1 | 1.38248 | | | |
| | | d1 0.05 | $N_1$ 1.6968 | $v_1$ 55.6 |
| r2 | 0.697671 | | | |
| | | d2 0.29 | | |
| r3 | 8.82301 | | | |
| | | d3 0.13 | $N_2$ 1.51823 | $v_2$ 59.0 |
| r4 | −4.05416 | | | |
| | | d4 0.01 | | |
| r5 | 1.25431 | | | |
| | | d5 0.04 | $N_3$ 1.64250 | $v_3$ 58.1 |
| r6 | 0.504859 | | | |
| | | d6 0.23 | | |
| r7 | −21.73913 | | | |
| | | d7 0.05 | $N_4$ 1.70154 | $v_4$ 41.1 |
| r8 | 0.92850 | | | |
| | | d8 0.15 | $N_5$ 1.69895 | $v_5$ 30.1 |
| r9 | −3.70370 | | | |
| | | d9 0.01 | | |
| r10 | 1.15308 | | | |
| | | d10 0.5 | $N_6$ 1.6968 | $v_6$ 55.6 |
| r11 | −0.94805 | | | |
| | | d11 0.134 | | |
| r12 | −0.84184 | | | |
| | | d12 0.15 | $N_7$ 1.76182 | $v_7$ 26.5 |
| r13 | 1.46366 | | | |
| | | d13 0.0625 | | |
| r14 | −1.58479 | | | |
| | | d14 0.0963 | $N_8$ 1.62041 | $v_8$ 60.3 |
| r15 | −0.71378 | | | |
| | | d15 0.01 | | |
| r16 | 100.00000 | | | |
| | | d16 0.1 | $N_9$ 1.62041 | $v_9$ 60.3 |
| r17 | −0.93275 | | | |

TABLE III

| | | | | |
|---|---|---|---|---|
| r1 | 1.47995 | | | |
| | | d1 0.06 | $N_1$ 1.62280 | $v_1$ 56.9 |
| r2 | 0.68227 | | | |
| | | d2 0.28 | | |
| r3 | 13.74382 | | | |
| | | d3 0.13 | $N_2$ 1.51823 | $v_2$ 59.0 |
| r4 | −3.48141 | | | |
| | | d4 0.01 | | |
| r5 | 1.20831 | | | |
| | | d5 0.04 | $N_3$ 1.62299 | $v_3$ 58.1 |
| r6 | 0.49574 | | | |
| | | d6 0.23 | | |
| r7 | ∞ | | | |
| | | d7 0.05 | $N_4$ 1.70154 | $v_4$ 41.1 |
| r8 | 0.91224 | | | |
| | | d8 0.15 | $N_5$ 1.69895 | $v_5$ 30.1 |
| r9 | −4.46428 | | | |
| | | 9 0.01 | d9 1.17536 | |
| | | d10 0.5 | $N_6$ 1.6779 | $v_6$ 55.5 |
| r11 | −0.90868 | | | |
| | | d11 0.134 | | |
| r12 | −0.83132 | | | |
| | | d12 0.15 | $N_7$ 1.76182 | $v_7$ 26.5 |
| r13 | 1.49009 | | | |
| | | d13 0.0625 | | |
| r14 | −1.67112 | | | |
| | | d14 0.0963 | $N_8$ 1.62041 | $v_8$ 60.3 |
| r15 | −0.73078 | | | |
| | | d15 0.01 | | |
| r16 | 71.94245 | | | |
| | | d16 0.1 | $N_9$ 1.62299 | $v_9$ 58.1 |
| r17 | −0.91166 | | | |

We claim:
1. An inverted telephoto type super-wide angle lens comprising a negative meniscus lens L1 convex to the front as numbered consecutively from front to rear, a biconvex lens L2, a negative meniscus lens L3 convex to the front, a cemented positive doublet of a negative lens L4 and a positive lens L5, a biconvex lens L6, a biconcave lens L7 the rear surface of which has radius of curvature greater than that of the front surface thereof, a positive meniscus lens L8 convex to the rear, and a positive lens L9, wherein the Abbe dispersion numbers $v_4$, $v_5$ and $v_6$ of said lenses L4, L5 and L6 satisfy the following conditions;
$53 < v_6 < 61$, $10 < v_4 - v_5 < 16$.

2. An inverted telephoto type super-wide angle lens as defined in claim 1 wherein the following conditions are satisfied where r, d, N and $v$, respectively, designate the radii of curvature of the refracting surfaces, the axial air separation or thickness of lenses, the refractive indices for the sodium d-line and the Abbe dispersion numbers numbered by subscripts in order from front to rear;

| | | | | |
|---|---|---|---|---|
| r1 | 1.64962 | | | |
| | | d1 0.06 | $N_1$ 1.6228 | $v_1$ 56.9 |
| r2 | 0.71623 | | | |
| | | d2 0.28 | | |
| r3 | 14.81481 | | | |
| | | d3 0.13 | $N_2$ 1.51823 | $v_2$ 59.0 |
| r4 | −3.41880 | | | |
| | | d4 0.01 | | |
| r5 | 1.20831 | | | |
| | | d5 0.04 | $N_3$ 1.62299 | $v_3$ 58.1 |
| r6 | 0.49574 | | | |
| | | d6 0.23 | | |
| r7 | ∞ | | | |
| | | d7 0.05 | $N_4$ 1.68273 | $v_4$ 44.5 |
| r8 | 0.97761 | | | |
| | | d8 0.15 | $N_5$ 1.69895 | $v_5$ 30.1 |
| r9 | −3.77074 | | | |
| | | d9 0.01 | | |
| r10 | 1.16782 | | | |
| | | d10 0.5 | $N_6$ 1.64000 | $v_6$ 60.2 |
| r11 | −0.88292 | | | |
| | | d11 0.134 | | |

-continued

| | | | |
|---|---|---|---|
| r12 | −0.82802 | | |
| | d12 0.15 | $N_7$ 1.76182 | $\nu_7$ 26.5 |
| r13 | 1.50082 | | |
| | d13 0.0625 | | |
| r14 | −1.67112 | | |
| | d14 0.0963 | $N_8$ 1.62041 | $\nu_8$ 60.3 |
| r15 | −0.73078 | | |
| | d15 0.01 | | |
| r16 | 100.00000 | | |
| | d16 0.1 | $N_9$ 1.62230 | $\nu_9$ 53.1 |
| r17 | −0.90074 | | |

3. An inverted telephoto type super-wide angle lens as defined in claim 1 wherein the following conditions are satisfied where r, d, N and $\nu$, respectively, designate the radii of curvature of the refracting surfaces, the axial air separation or thickness of lenses, the refractive indices for the sodium d-line and the Abbe dispersion numbers numbered by subscripts in order from front to rear;

| | | | |
|---|---|---|---|
| r1 | 1.38248 | | |
| | d1 0.05 | $N_1$ 1.6968 | $\nu_1$ 55.6 |
| r2 | 0.697671 | | |
| | d2 0.29 | | |
| r3 | 8.82301 | | |
| | d3 0.13 | $N_2$ 1.51823 | $\nu_2$ 59.0 |
| r4 | −4.05416 | | |
| | d4 0.01 | | |
| r5 | 1.25431 | | |
| | d5 0.04 | $N_3$ 1.64250 | $\nu_3$ 58.1 |
| r6 | 0.504859 | | |
| | d6 0.23 | | |
| r7 | −21.73913 | | |
| | d7 0.05 | $N_4$ 1.70154 | $\nu_4$ 41.1 |
| r8 | 0.92850 | | |
| | d8 0.15 | $N_5$ 1.69895 | $\nu_5$ 30.1 |
| r9 | −3.70370 | | |
| | d9 0.01 | | |
| r10 | 1.15308 | | |
| | d10 0.5 | $N_6$ 1.6968 | $\nu_6$ 55.6 |
| r11 | −0.94805 | | |
| | d11 0.134 | | |
| r12 | −0.84184 | | |
| | d12 0.15 | $N_7$ 1.76182 | $\nu_7$ 26.5 |
| r13 | 1.46366 | | |
| | d13 0.0625 | | |
| r14 | −1.58479 | | |
| | d14 0.0963 | $N_8$ 1.62041 | $\nu_8$ 60.3 |
| r15 | −0.71378 | | |
| | d15 0.01 | | |
| r16 | 100.00000 | | |
| | d16 0.1 | $N_9$ 1.62041 | $\nu_9$ 60.3 |
| r17 | −0.93275 | | |

4. An inverted telephoto type super-wide angle lens as defined in claim 1 wherein the following conditions are satisfied where r, d, N and $\nu$, respectively, designate the radii of curvature of the refracting surfaces, the axial air separation or thickness of lenses, the refractive indices for the sodium d-line and the Abbe dispersion numbers numbered by subscripts in order from front to rear;

| | | | |
|---|---|---|---|
| r1 | 1.47995 | | |
| | d1 0.06 | $N_1$ 1.62280 | $\nu_1$ 56.9 |
| r2 | 0.68227 | | |
| | d2 0.28 | | |
| r3 | 13.74382 | | |
| | d3 0.13 | $N_2$ 1.51823 | $\nu_2$ 59.0 |
| r4 | −3.48141 | | |
| | d4 0.01 | | |
| r5 | 1.20831 | | |
| | d5 0.04 | $N_3$ 1.62299 | $\nu_3$ 58.1 |
| r6 | 0.49574 | | |
| | d6 0.23 | | |
| r7 | ∞ | | |
| | d7 0.05 | $N_4$ 1.70154 | $\nu_4$ 41.1 |
| r8 | 0.91224 | | |
| | d8 0.15 | $N_5$ 1.69895 | $\nu_5$ 30.1 |
| r9 | −4.46428 | | |
| | d9 0.01 | | |
| r10 | 1.17536 | | |
| | d10 0.5 | $N_6$ 1.6779 | $\nu_6$ 55.5 |
| r11 | −0.90868 | | |
| | d11 0.134 | | |
| r12 | −0.83132 | | |
| | d12 0.15 | $N_7$ 1.76182 | $\nu_7$ 26.5 |
| r13 | 1.49009 | | |
| | d13 0.0625 | | |
| r14 | −1.67112 | | |
| | d14 0.0963 | $N_8$ 1.62041 | $\nu_8$ 60.3 |
| r15 | −0.73078 | | |
| | d15 | 0.01 | |
| r16 | 71.94245 | | |
| | d16 0.1 | $N_9$ 1.62299 | $\nu_9$ 58.1 |
| r17 | −0.91166 | | |

* * * * *